United States Patent [19]

Ogawa et al.

[11] 4,065,369
[45] Dec. 27, 1977

[54] ACTIVATED GAS REACTION APPARATUS & METHOD

[75] Inventors: Kazuyuki Ogawa; Masahiko Hirose, both of Yokohama; Masahiro Shibagaki, Hiratsuka; Yoshio Murakami, Yokohama; Yasuhiro Horiike, Naritanishi, all of Japan

[73] Assignee: Tokyo Shibaura Electric Co., Ltd., Kawasaki, Japan

[21] Appl. No.: 705,694

[22] Filed: July 15, 1976

[30] Foreign Application Priority Data

July 18, 1975 Japan .................................. 50-87235

[51] Int. Cl.$^2$ ......................... B01K 1/00; H01T 19/04
[52] U.S. Cl. ............................. 204/164; 219/121 P; 250/531
[58] Field of Search .................... 204/164, 192 E; 250/531; 219/121 P

[56] References Cited

U.S. PATENT DOCUMENTS

| | | | |
|---|---|---|---|
| 3,428,548 | 2/1969 | Hollahan | 250/531 |
| 3,775,621 | 11/1973 | Gorin | 250/531 |

Primary Examiner—Donald L. Walton
Assistant Examiner—Aaron Weisstuch
Attorney, Agent, or Firm—Oblon, Fisher, Spivak, McClelland & Maier

[57] ABSTRACT

An activated gas reaction apparatus which comprises an activation chamber; feeding means for conducting feed gas into the activation chamber; microwave power-generating means for activating raw gas received in the activation chamber; and a reaction chamber provided apart from the activation chamber for reaction of activated gas, the activated gas reaction apparatus so constructed as to satisfy the following formula:

$$2\pi f p l \geq 4 \times 10^9$$

where
 $f$ = frequency (Hz) of microwaves
 $p$ = gas pressure (torr) in the activation chamber
 $l$ = length (cm) of the activation chamber extending in the direction in which the electromagnetic field provided by the microwave source is applied.

10 Claims, 12 Drawing Figures

ACTIVATED GAS REACTION APPARATUS & METHOD

BACKGROUND OF THE INVENTION

This invention relates to an activated gas reaction apparatus and more particularly to apparatus employing gas activated by microwave power.

Recently in the field of semiconductor manufacturing, there has been developed an apparatus designed to activate gas by radio frequency (RF) discharge, and carry out the ashing of a photoresist or the etching of, for example, a silicon layer. Ashing or etching of a film is supposed to proceed by radical reaction between the film and activated gas.

With the above-mentioned apparatus, an activation chamber in which feed gas is activated by RF discharge is generally concurrently used as a reaction chamber in which a chemical reaction such as ashing takes place. Further, activation of a reaction gas has been effected by RF power of 13.5 MHz and at a pressure lower than 1 torr. Such apparatus has the drawback that the ashing of, for example, a photoresist, consumes a great deal of time, because the RF discharge is carried out at low pressure and low power density. Further disadvantages of the prior art apparatus are that a pressure higher than 1 torr results in unstable RF discharge; high power density is unavailable; and power efficiency is low.

SUMMARY OF THE INVENTION

It is accordingly an object of this invention to provide an activated gas reaction apparatus which can carry out stable activation of feed gas even at a pressures higher than 1 torr, with improved power efficiency and in much shortened time.

The above-mentioned and other objects of this invention are attained by providing an activated gas reaction apparatus which comprises an activation chamber; feeding means for conducting feed gas into the activation chamber; microwave power-generating means for activation of raw gas received in the activation chamber; and a reaction chanber provided apart from the activation chamber to carry out reaction of activated gas drawn out of the activation chamber, the activated gas reaction apparatus so constructed as to satisfy the following formula:

$$2\pi fpl \geq 4 \times 10^9$$

where:

$f$ = frequency (Hz) of microwaves
$p$ = gas pressure (torr) in the activation chamber
$l$ = length (cm) of the activation chamber extending in the direction in which the electromagnetic field provided by the microwave source is applied.

BRIEF DESCRIPTION OF THE DRAWINGS

This invention can be more fully understood from the following detailed description when taken in conjunction with the accompanying drawings, in which.

DESCRIPTION OF THE PREFERRED EMBODIMENTS

There will now be described by reference to the appended drawings the construction and operation of an activated gas reaction apparatus embodying this invention which is adapted for removal of a photoresist deposited on a semiconductor element.

Figure 1:
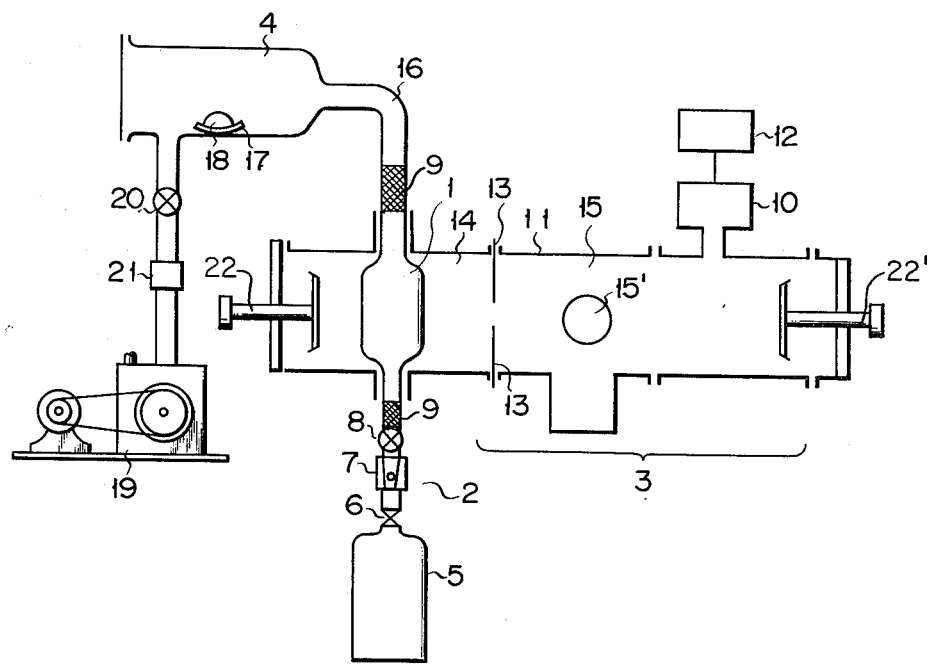
FIG. 1 schematically illustrates an activated gas reaction apparatus embodying this invention.

A photoresist removal device schematically shown in FIG. 1 is mainly formed of an activation chamber 1; oxygen gas-feeding means 2; microwave power-generating means 3 for activation of oxygen gas; and a reaction chamber 4 in which a photoresist is removed by activated oxygen gas carried from the activation chamber 1.

First, oxygen gas is introduced from a oxygen gas feed cylinder 5 into a quartz activation chamber 1 which is 20 mm in inner diameter and 30 mm in the length extending in the direction in which an electric field is applied. A gas pressure control valve 6, gas flow meter 7 and gas flow rate control valve 8 are provided between the oxygen cylinder 5 and activation chamber 1, in order to regulate the pressure and flow rate of oxygen gas supplied to the activation chamber 1. The oxygen cylinder 5, gas pressure control valve 6, gas flow meter 7, and gas flow rate control valve 8 jointly constitute oxygen feeding means. A copper mesh 9 is provided around the inlet and outlet of the activation chamber to prevent the leakage of microwaves. The activation chamber 1 of this invention is the space where raw gas is substantially activated by a high frequency electric field.

The microwave power-generating means 3 comprises a magnetron 10 provided with a power source 12 and a waveguide 11 for drawing off microwaves generated by the magnetron 10. Part of the waveguide 11 is partitioned by a wall 13 bored at the center, thus forming a cavity resonator 14 of a $TE_{101}$ mode. If necessary, it is possible to install an isolator 15 having an isolation magnet 15' in order to prevent microwaves reflected by mismatch from the cavity resonator 14 or other sections from being carried into the magnetron 10 with the resultant destruction thereof. Microwaves of, for example, 2450 MHz produced by the magnetron 10 are brought into the cavity resonator 14 through the hole of the partition wall 13. Obviously, it is possible to apply microwaves of other frequencies, for example, 915 MHz rather than 2.45 GHz. Microwaves thus created are effectively utilized for discharge in the activation chamber.

Figure 2A:
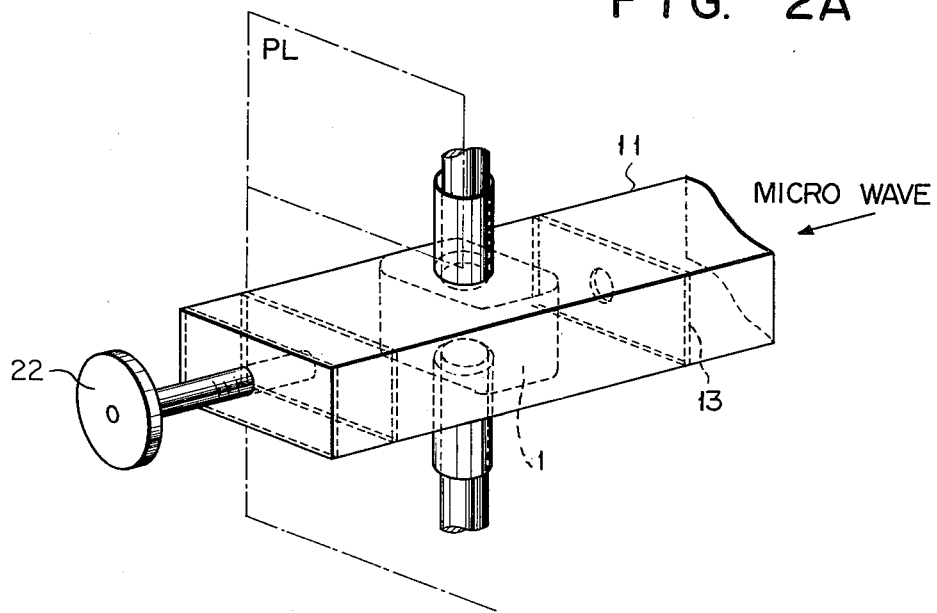
FIG. 2A is a perspective view of the detailed portion of a discharge tube.
Figure 2B:
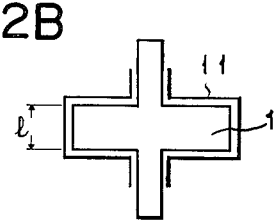
FIG. 2B is a cross sectional view of the same through plane PL of FIG. 2A.

A pair of movable tuning plungers 22 and 22' are attached to the ends of the waveguide 11, respectively, thereby to effect matching. FIG. 2A shows in detail that part of the waveguide 11 which is adjacent to the above-mentioned activation chamber. The reference numerals in FIG. 2A indicate the same members as in FIG. 1. FIG. 2B is a schematical, cross-sectional view of the waveguide 11 taken along the plane PL in FIG. 2A. In FIG. 2B "l" denotes the length of the activation chamber which extends in the direction of electric field application.

Oxygen gas received in the activation chamber 1 is activated by microwave discharge. Activated oxygen is conducted through a feed pipe 16 to the reaction chamber 4 which has a cylindrical form 100 mm in diameter and 200 mm long. An object 18 being reacted by activated gas, for example, a semiconductor element masked with a photoresist, is placed on a holder 17 set in the reaction chamber 4. The photoresist is subjected to ashing by activated oxygen gas drawn into the reaction chamber 4. Pressure in the reaction chamber 4 is measured by a diaphragm type pressure gauge (not shown). Unnecessary gas still remaining in the activated gas reaction apparatus after completion of reaction is drawn off from the reaction chamber 4 by an exhaust pump 19, for example, a rotary pump. This exhaust-discharging system is provided with a valve 20 and trap 21.

There will now be described the experiment of removing a photoresist by the activated gas reaction apparatus of this invention constructed as mentioned above. The reaction chamber 4 was evacuated by the rotary pump 19 to about $10^{-1}$ to $10^{-3}$ torr. After the evacuated condition of the exhaust-discharging system became substantially stable, oxygen was fed into the activation chamber 1. Pressure in the reaction chamber 4 was kept at about 2 torr. 2450 MHz microwaves developing about 400W were applied to the cavity resonator 14 to activate oxygen gas received in the activation chamber 1. The activated oxygen gas was carried into the reaction chamber 4 which was not reached by plasma-excited light, to be chemically reacted with a photoresist formed of a nonvolatile high molecular compound. As a result, it was proved that the photoresist could be removed at normal temperature. The object 18 of chemical treatment consisted of a silicon substrate coated with a rubbery photoresist by a spinner, followed by drying at 150° C for 30 minutes.

Figure 3:
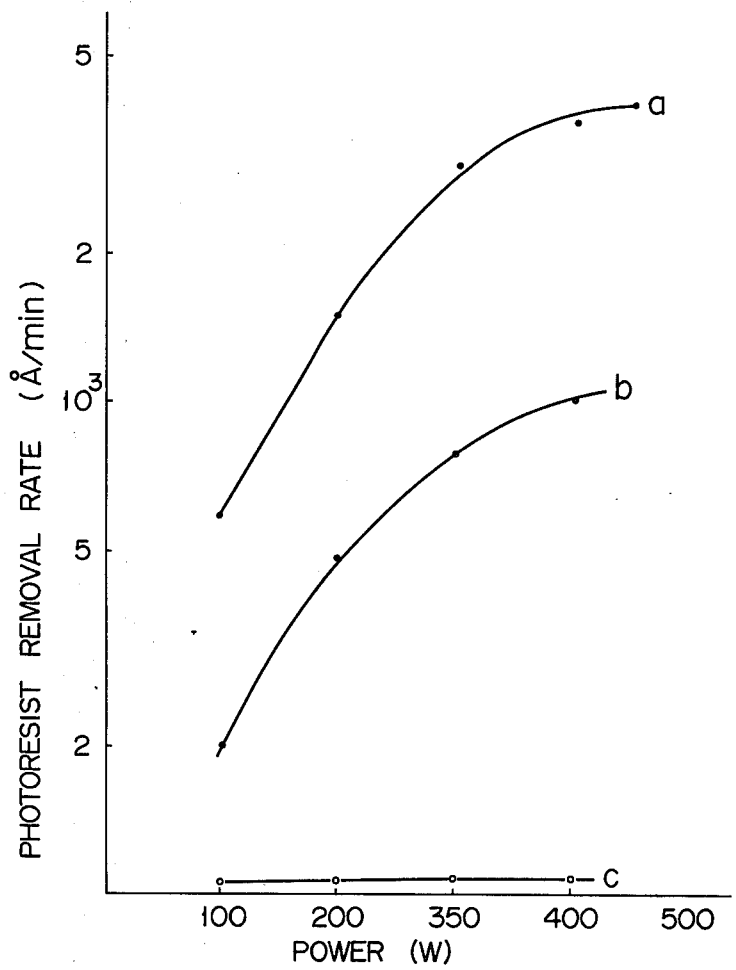
FIG. 3 graphically shows the relationship between the power applied and the rate at which a photoresist deposited on a semiconductor element is removed by the apparatus of the invention.

The curve a of FIG. 3 shows changes in the photoresist removal rate (A/min) corresponding to variation in the amount of power applied, when the photoresist was removed by the activated gas reaction apparatus of this invention. The curves b, c of FIG. 3 indicate changes in the photoresist removal rate (A/min) corresponding to variation in the amount of power applied when the photoresist was removed by the prior art device. Curve b represents the photoresist removal rate when the object 18 of the chemical treatment was placed in the plasma-excited light, and curve c denotes the photoresist removal rate when said object 18 was disposed outside of the plasma-excited light. The prior art photoresist-removing device was provided with high frequency power-generating means developing RF waves of 13.56 MHz and measured 30 cm in length, extending in the direction in which an electric field was applied. Pressure in the activation chamber was set at 1 torr. As seen from curve a of FIG. 3, when a power of 400W was applied, the photoresist removal rate by the apparatus of this invention indicated 3500A/min, a value more than three times larger than 1000A/min realized by the prior art device when the object 18 was placed in the plasma-excited light. Further, when the object 18 was set outside of the plasma-excited light, the prior art device substantially failed to remove the photoresist. It has already been mentioned that plasma-excited light does not reach the reaction chamber of the apparatus of this invention. Further, the object 18, brought into contact with the plasma-excited light, had its surface heated to 150° to 200° C, whereas the surface of the object 18 when not contacted by the plasma-exciting light in the apparatus of this invention is not heated at all. Experiments were also made to determine the rate of oxidation of the surface of object 18 made of, for example, silver and copper respectively, by the apparatus of this invention as well as by the prior art device. The apparatus of the invention effected oxidation at a rate about three times faster than the oxidation by the prior art device when the object 18 was placed in the plasma-excited light.

As previously mentioned, the activated gas reaction apparatus of this invention is so constructed as to satisfy the following formula:

$$2\pi fpl \geq 4 \times 10^9$$

where:
 $f$ = frequency (Hz) of microwaves
 $p$ = pressure (torr) in the activation chamber
 $l$ = length (cm) of the activation chamber extending in the direction in which the electromagnetic field provided by the microwave source is applied.

With the above-activated gas reaction apparatus, $f$ is chosen to be $2450 \times 10^6$, $p$ to be 2 and $l$ to be 3. Thus, $2\pi fpl$ is calculated to be $92.316 \times 10^9$, which is greater than $4 \times 10^9$. The present inventors have discovered that with the activated gas reaction apparatus satisfying the above-mentioned conditions, a plasma is effectively maintained in the activation chamber with a resultant increase in power efficiency. This increase in power efficiency is also clearly proved by an increase in the rate of removing a photoresist by the activated oxygen. It has also been found that with an activated gas reaction apparatus meeting the aforesaid requisites, the walls of the respective sections of the apparatus are subject to little deterioration with time, thereby enabling the entire apparatus to be always operated under a stable condition. Contrary to this invention, the prior art device does not satisfy any of the aforesaid requisites. With the prior art device, $2\pi fpl$, for example, has a value smaller than $4 \times 10^9$. Moreover, the previously described conditions are applicable to gases other than $O_2$, such as $H_2$, $H_2O$, $N_2$ and $CF_4$ or mixtures thereof generally used in surface treatment.

Further, a test was made of the possible changes in the property of a semiconductor element stripped of a coated photoresist by activated oxygen gas. In this test, a thermal oxidation film was formed on an $n$ type silicon substrate with a thickness of 1100A. Thereafter, an aluminium layer was vapor-deposited on said oxide film, followed by heat treatment at 520° in an atmosphere of nitrogen gas. The aluminum layer was formed into an electrode pattern. This MOS capacitor had a threshold voltage of $-2$ volts. Prior to vapor deposition of the aluminum layer, said; MOS capacitor was exposed to activated oxygen for 60 minutes in the apparatus of this invention using microwave power of 400W applied and the pressure of activated oxygen gas in the reaction chamber chosen to be 1 to 2 torr units. The MOS capacitor thus treated indicated the original threshold voltage of $-2$ volts. This fact proves that when a photoresist coated on a semiconductor substrate is removed by activated oxygen in the apparatus of invention, the semiconductor element is hardly subject to damage. With the apparatus of this invention, the activation chamber is separated from the reaction chamber, thus preventing the object of treatment placed in the reaction chamber from impingement by high speed ions, electrons and photons. In constrast to the above test, an MOS capacitor exposed to activated oxygen in the prior art device had its threshold voltage changed to −3 to −7 volts. Even when said MOS capacitor was later subjected to heat treatment in an atmosphere of nitrogen, the original threshold voltage of the MOS capacitor was not restored.

The density of activated material in the raw gas charged in the activation chamber rapidly decreases during passage to the reaction chamber by collision with the walls of the passage tube or with molecules of other gases. The extent of said decreased density varies widely with the kind of activated material and the kinds of other materials brought into collision with the activated material. Therefore, it is necessary to properly select other materials which may be expected to collide with activated material.

The advantageous effects of this invention may be summarized as follows:

I. Stable discharge and shortened time of treatment at high gas pressure

It has been disclosed that with the activated gas reaction apparatus of this invention, a stable discharge is attained even at pressures as high as scores of torr units. There will now be described from the present inventors' experiments how a discharge at such high gas pressure contributes to the formation of an activated gas.

Figure 4:
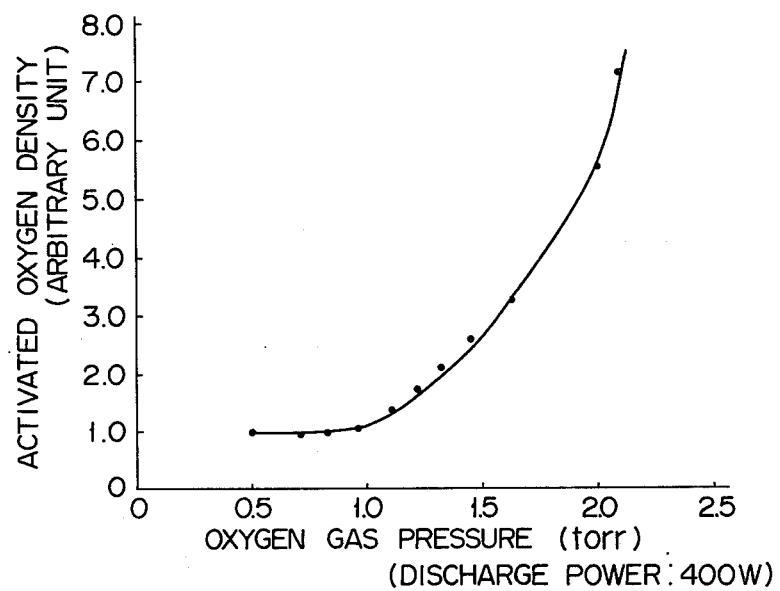
FIG. 4 indicates the relationship between the pressure of feed oxygen gas received in the activation chamber and the density of activated oxygen therein.

An activated gas is supposed to be formed of unstable molecules or atoms resulting from partial breakage of chemical bonds of stable molecules. An activated gas generally has a magnetic moment based on an electron spin. Measurement of this magnetic moment by electron spin resonance (ESR) can determine the density of activated gas atoms with high precision. FIG. 4 graphically exemplifies the results of said determination when oxygen gas was used as the raw gas for activation. The ordinate of FIG. 4 shows the density of activated oxygen gas and the abscissa denotes the pressure of oxygen gas. As apparent from FIG. 4, when the pressure of oxygen gas exceeds about 1 torr, activated oxygen rapidly increases in density. Namely, it is seen that a stable discharge at a higher pressure than 1 torr can shorten treating time. The activated gas reaction apparatus of this invention enables a stable discharge to be carried out even at a pressure as high as scores of torr units, significantly shortening treating time.

II. Discharge at high power density and shortened treating time

Figure 5:
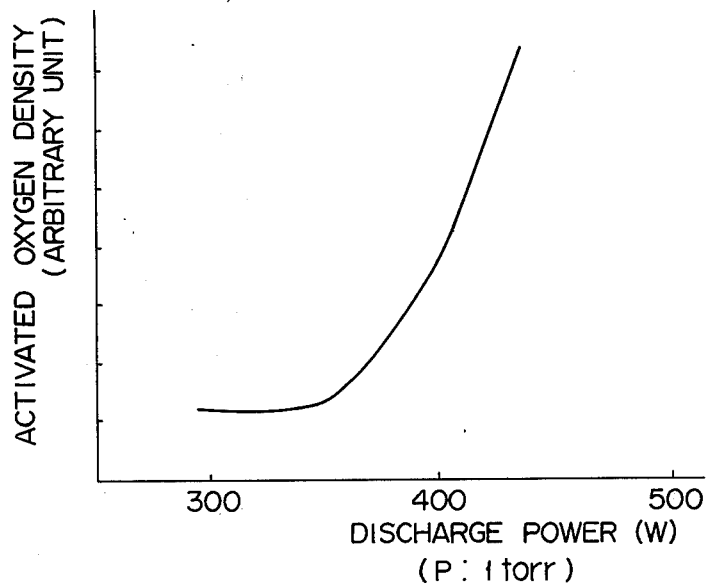
FIG. 5 graphically presents the relationship of the discharge power and the density of activated oxygen in the activated gas reaction apparatus of the invention.

FIG. 5 graphically indicates the relationship between the density of activated oxygen and discharge power (input) as measured from electron spin resonance (ESR). The discharge power has a value proportional to power density. FIG. 5 shows that the density of activated oxygen increases little until discharge power reaches 350W, and rapidly rises when the discharge power exceeds 350W. The reason why the prior art device requires a long treating time is supposed to be that the activated material has a low density in the raw gas. Further, the low density of activated material obtained by the prior art device is assumed to result mainly from the fact that power of low density is applied for activation as seen from FIG. 5. The reason why only low power density is available for the prior art device is that the same space is concurrently used not only as a reaction chamber but also as an activation chamber, and a low frequency of 13.56 MHz is applied for activation of, for example, oxygen. The concurrent use of the reaction chamber as an activation chamber necessarily enlarges the space into which the electromagnet field is conducted. Adoption of a low frequency to match the arrangement of an electrode and other elements with such large space unavoidably leads to an increase in the loss of electromagnetic waves to an external unnecessary space. The foregoing description will be understood to support the reason why the present inventors have decided to adopt microwaves. With the apparatus of this invention, power density in the activation chamber is more than 20 times larger than in the activation chamber of the prior art device. As is well known, the electromagentic energy of microwaves is fully sealed in, for example, a waveguide and is prevented from loss caused by leakage to the outside. With the apparatus of this invention, the reaction chamber and activation chamber are separately provided as previously mentioned, admitting of application of microwaves, and increased applied power density with resultant noticeable decrease of treating time.

III. Examples of shortened treating time

Oxygen gas activated by the apparatus of this invention was used in oxidizing copper and silver and removing a photoresist used as a mark for an integrated circuit, the results being set forth in the following Table 1.

Table 1

| | Treating Time | | |
| --- | --- | --- | --- |
| | Treating time with the prior art device | Treating time with the apparatus of this invention | Product |
| Copper | 30 seconds at maximum | 10 seconds at maximum | CuO |
| Silver | 30 seconds at maximum | 10 seconds at maximum | Ag$_2$O |
| Photoresist used as a mask for integrated circuit | 15 to 20 minutes | 5 minutes at maximum | |

Table 1 above shows that the apparatus of this invention has a treating efficiency about 3 to 4 times larger than the prior art device. The data given in Table 1 above relate to the case where power of 300W was applied. However, the apparatus of this invention still has surplus capacity to apply input power up to about 1000W.

IV. Simplified operation

The apparatus of this invention using a microwave magnetron as a source of high frequency waves can be operated very easily. As is the case with, for example, an electronic range, a compact but powerful magnetron generating microwaves of 2450 MHz or 915 MHz is available for the apparatus of this invention. Where such a compact but powerful magnetron is used with the apparatus of this invention which has a fully large surplus output capacity, adjustment is not required even when somewhat unsatisfactory matching occurs between a load and said output. With the embodiment of this invention, an isolator is provided to avoid the deterioration of magnetron resulting from mismatch. Obviously, the isolator can well be dispensed with. The oscillation frequency of the magnetron is fixed from the operating principle regardless of matching with a load. Consequently, application of a magnetron to the apparatus of this invention does not raise any problem conflicting with microwave laws and regulations.

V. Other advantages

The activated gas reaction apparatus of this invention which, as previously mentioned, used microwaves as a source of high frequency waves is hardly subject to loss of high frequency power. Since the reaction chamber and activation chamber are separately provided, an object of treatment is little damaged by impingement of, for example, high speed ions, electrons and photons.

Modifications of this invention with respect to the following items will now be described.

1. Frequency

With the activated gas reaction apparatus of this invention, any high frequency is theoretically available, provided it satisfies the formula $2\pi f p l \geq 4 \times 10^9$. In practical application, however, the range of high frequency is subject to limitation. Under the standards for industrial, scientific and medical apparatus (abbreviated as ISM apparatus), the permitted frequencies are 13.56 MHz, 915 MHz and 2450 MHz. Application of 13.56 MHz waves requires a very large waveguide or cavity. Provision of such a big waveguide or cavity is practically impossible. Therefore, application of 13.56 MHz waves is excluded from the scope of this invention.

2. Activation chamber

Various systems of coupling a cavity and discharge tube (activation chamber) are already known. Also known are the system of coupling a discharge tube with a waveguide using not only a standing wave, but also progressive wave, and the system of inserting a discharge tube in a coaxial line together with a suitable tuning tube.

With any system, a discharge tube is inserted into a cavity oscillated essentially in a fundamental mode so as to most effectively absorb an electromagnetic field in said cavity.

3. Material and shape of a discharge tube

Figure 6:
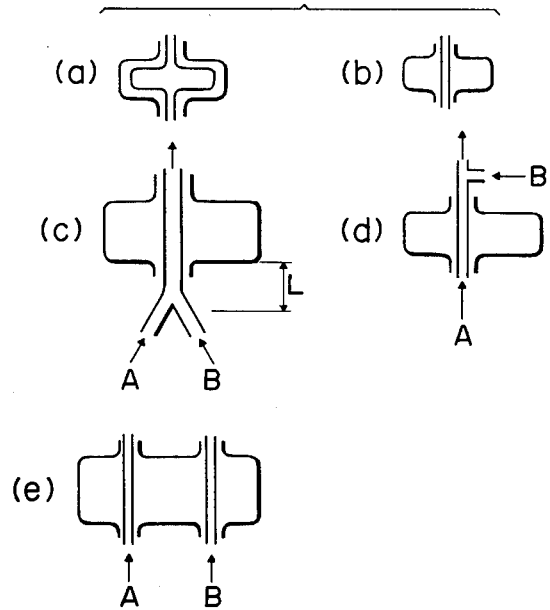
FIGS. 6(a) to 6(e) schematically illustrate various modifications of the activation chamber used with the apparatus of the invention.

The material of the discharge tube is preferably a type which is unlikely to absorb high frequency waves and has high heat resistance, because the discharge tube is inserted into a cavity. Customarily, quartz is used for this purpose. High grade alumina percelain may also be applied as the material of the discharge tube. Generally preferred is a discharge tube which is so shaped as to fill a cavity in which the of greatest intensity of the electric field is created (FIG. 6b).

4. Method of introducing gas into a discharge tube

A discharge tube (activation chamber) may be charged with not only a single gas but also a mixture of different kinds of gas. As shown in FIG. 6c, for example, a mixture of gases A and B may be introduced into a discharge tube. If, in this case, a reaction distance L between the converging point of the gases A and B and the discharge region is properly chosen, then a product AB derived from reaction between both gases A and B can be activated. Further as shown in FIG. 6d, it is possible first to draw only the gas A into a discharge tube and, after activation of said gas A, introduce the gas B to be mixed with the activated gas A. Where reaction between both gases A and B is expected to exert a harmful effect, it is possible to provide a multimode cavity as shown in FIG. 6e to activate the gases A and B in separate regions of the electromagnetic field. In this case, a cavity divided into two sections may be used. Further, it is possible to combine the above-mentioned various methods of gas supply to the discharge tube.

Figure 7:
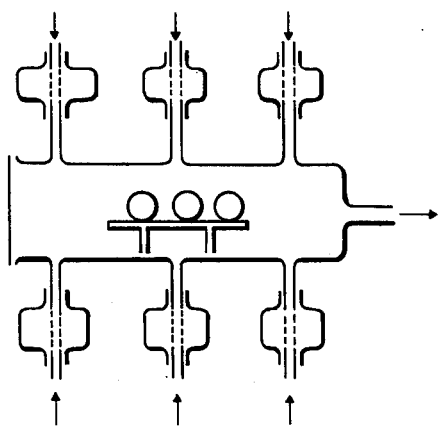
FIG. 7 shows the reaction chamber of the apparatus of the invention into which activated gas is introduced from a plurality of activation chambers.

5. Feeding of activated gas to reaction chamber

Where an object of treatment is voluminous, it is preferred for uniform reaction between the object and activated gas to provide a large number of inlets for the reaction chamber and conduct the activated gas into the reaction chamber through said inlets. Where reaction is expected to proceed quickly, this arrangement is desired. Activated gas brought into the reaction chamber through many inlets may be produced, as shown in FIG. 7, in separate activation chambers. Or, activated gas initially activated in the same activation chamber may later be branched off. Control of the respective flow rates of activated gas flowing into the reaction chamber through many inlets can attain a most effective reaction.

The effective life of gases activated in the activation chamber is largely determined by the kind of material brought into contact with the activated gas. Contact of activated gas with organic material such as rubber or oil which readily reacts with the activated gas is generally considered very objectionable. Therefore, care should be taken to prevent activated gas from being exposed to any such undesirable material while passing from the activation chamber to the reaction chamber. It is possible to use an activated complex consisting of a mixture of two or more activated gases for reaction in the reaction chamber. In this case, it is necessary to place the reaction chamber at a point properly spaced from the converging point of the mixed activated gases.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An activated gas reaction process comprising:
    conducting feed gas to an activation chamber,
    activating the feed gas in the activation chamber by applying microwave power to the feed gas from a microwave source under the conditions which satisfy the following formula:

$$2\pi fpl \geq 4 \times 10^9$$

where:
- $f$ = frequency of microwaves in Hz,
- $p$ = gas pressure in the activation chamber in torr,
- $l$ = length of the activation chamber in cm. extending in the direction in which the electromagnetic field is provided by the microwave source, conducting the activated gas delivered from the activation chamber to a reaction chamber apart from the activation chamber and, reacting the activated gas with a non-gaseous material in the reaction chamber.

2. The activated gas reaction process recited in claim 1 wherein the microwave source comprises:
means for generating microwaves and a waveguide for conducting the produced microwaves.

3. The activated gas reaction process recited in claim 1 wherein the microwave source comprises:
means for generating microwaves and a waveguide for conducting the produced microwaves, the activation chamber radially penetrating the waveguide.

4. The activated gas reaction process recited in claim 3 wherein the waveguide is partitioned by a wall bored at the center and a movable tuning plunger to form a cavity and the activating step includes the step of creating the electric field with greatest intensity at that portion of the cavity penetrated by the activation chamber.

5. An activated gas reaction apparatus which comprises:
an activation chamber;
a reaction chamber apart from said activation chamber;
feeding means for conducting feed gas to the activation chamber; and
microwave power-generating means for activating the feed gas in the activation chamber.

6. An activated gas reaction apparatus according to claim 5, wherein the microwave power-generating means includes a waveguide for conducting produced microwaves, the activation chamber radially penetrating the waveguide, said waveguide forming a cavity, and the activation chamber is so shaped as to fill said cavity.

7. An activated gas reaction apparatus according to claim 5, wherein the cavity is a multimode type penetrated by a plurality of activation chambers.

8. An activated gas reaction apparatus according to claim 6, wherein an isolator is disposed in the waveguide.

9. An activated gas reaction apparatus according to claim 5, wherein a copper mesh net is provided around the inlet and outlet of the activation chamber to prevent microwaves from leaking to the outside.

10. An activated gas reaction apparatus according to claim 5, wherein the reaction chamber is provided with a plurality of inlets through which an activated gas is brought in.

* * * * *